United States Patent [19]
Lehman

[11] 3,718,203
[45] Feb. 27, 1973

[54] GROUND EFFECT VEHICLE WITH INTEGRATED FORWARD THRUST MEANS

[76] Inventor: Walter R. Lehman, 64 Spruce Street, Hicksville, N.Y. 11801

[22] Filed: Aug. 30, 1971

[21] Appl. No.: 176,006

[52] U.S. Cl. ..............................................180/120
[51] Int. Cl. ...........................B60v 1/08, B60v 1/14
[58] Field of Search.......180/120, 121, 122, 116, 117

[56] References Cited

UNITED STATES PATENTS

| | | | |
|---|---|---|---|
| 3,118,513 | 1/1964 | Cockerell | 180/120 |
| 3,587,771 | 6/1971 | Faure | 180/120 |
| 3,285,537 | 11/1966 | Whittley | 180/120 X |
| 3,467,213 | 9/1969 | Walker | 180/120 |
| 3,331,462 | 7/1967 | Wernicke | 180/116 X |
| 3,126,169 | 3/1964 | Kucher | 180/120 |

Primary Examiner—Leo Friaglia
Assistant Examiner—John P. Silverstrim
Attorney—James P. Malone

[57] ABSTRACT

An air cushion vehicle is provided which utilizes a single motor to provide the air cushion and forward thrust. Front mounted air intakes are connected as inputs to a fan. The fan is driven by air by a propeller which also provides forward thrust through a rear port. When the craft is moving forward the air from the front intakes drive the fan so as to provide a portion of the air cushion. A control vane is provided adjacent to the rear port for controlling the air from the propeller. This vane determines the amount of air fed to the fan and to the rear port. The vane may also be used for steering purposes.

3 Claims, 5 Drawing Figures

INVENTOR.
WALTER R. LEHMAN

INVENTOR.
WALTER R. LEHMAN

GROUND EFFECT VEHICLE WITH INTEGRATED FORWARD THRUST MEANS

This invention relates to vehicles of the type riding on an air cushion. More particularly the invention relates to having integral forward thrust means.

Air cushion vehicles such as shown in U.S. Pat. No. 3,118,518, utilize control of the air stream through the bottom port to provide forward thrust for the vehicle. Other designs use separate motor means for providing the forward thrust.

The present invention has a rear port to provide the forward thrust and uses only one motor which provides the air cushion and the forward thrust.

Accordingly, a principal object of the invention is to provide new and improved air cushion vehicle means.

Another object of the invention is to provide new and improved air cushion vehicle means and having a rear port to provide forward thrust.

Another object of the invention is to provide new and improved air cushion vehicle means having a rear port to provide forward thrust and utilizing only one motor to provide both the air cushion and the forward thrust.

Another object of the invention is to provide new and improved air cushion means wherein air pressure provided by forward motion of the vehicle helps drive a freely rotatable fan to maintain the air cushion.

Another object is to provide an air cushion vehicle having a rear port with a control vane which controls the amount of air for the air cushion and for forward thrust and which also provides steering.

Another object is to eliminate any need for counter-torque devices in hovercraft, as no torque is developed by the freely rotatable fan of the present invention.

These and other objects of the invention will be apparent from the following specifications and drawings of which, FIGS. 1 and 5 are top views of an embodiment of the invention.

Figure 2:
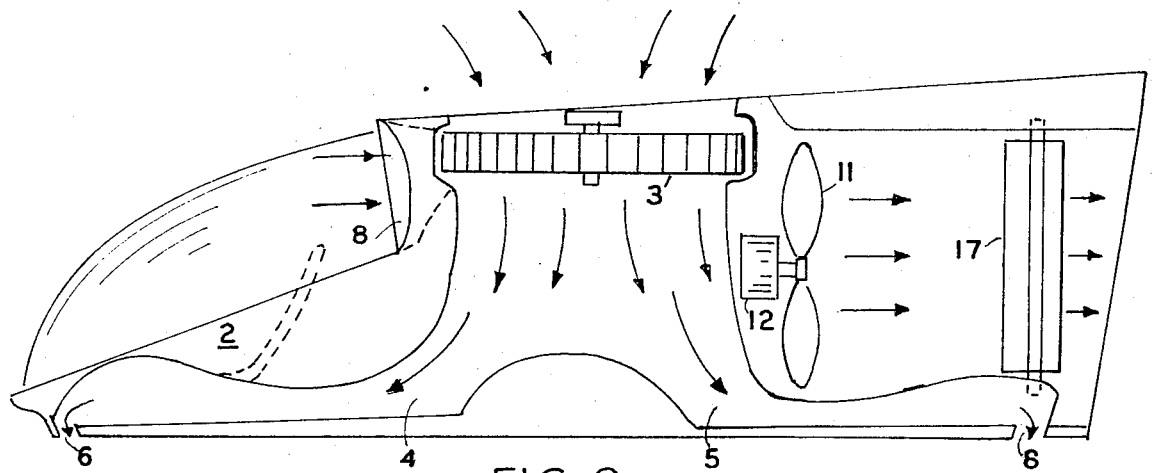
FIG. 2 is a side view of FIG. 1.

Referring to the drawings, the invention generally comprises a body member 1, which has a driver and passenger compartment 2 at the front end of the body. A centrally located fan 3 drives air downwardly through the ducts 4 and 5, to the peripheral slot 6 which extends around the lower periphery to the body 1. This air pressure provides an air cushion in a conventional manner, for instance, as shown in U.S. Pat. No. 3,118,513. A conventional skirt member may be used to contain the air cushion. A pair of air intake members 7 and 8 are provided in the forward portion of the vehicle adjacent to the control cabin 2. These air intakes are connected by ducts 7' and 8' to the central well 10 of the fan 3. The fan is freely rotatably mounted in the body and is driven by the propeller 11 which is driven by the motor 12.

The propeller 11 directs air received from the side air intake ports 13 and 14 and directs it towards a rear port 15 via the duct 16.

Centrally located in the duct 16 is a rotatably mounted vane 17. The duct 18 connects the duct 16 from a point adjacent to the vane 17 back to the well 10 of the fan 3. Therefore, when the vane 17 is in the position shown in FIG. 1, air from the propeller 11 is directed via the duct 18 to the well 10 so as to drive the fan 3. The fan 3 also receives air from the forward intakes 7 and 8.

Figure 1:
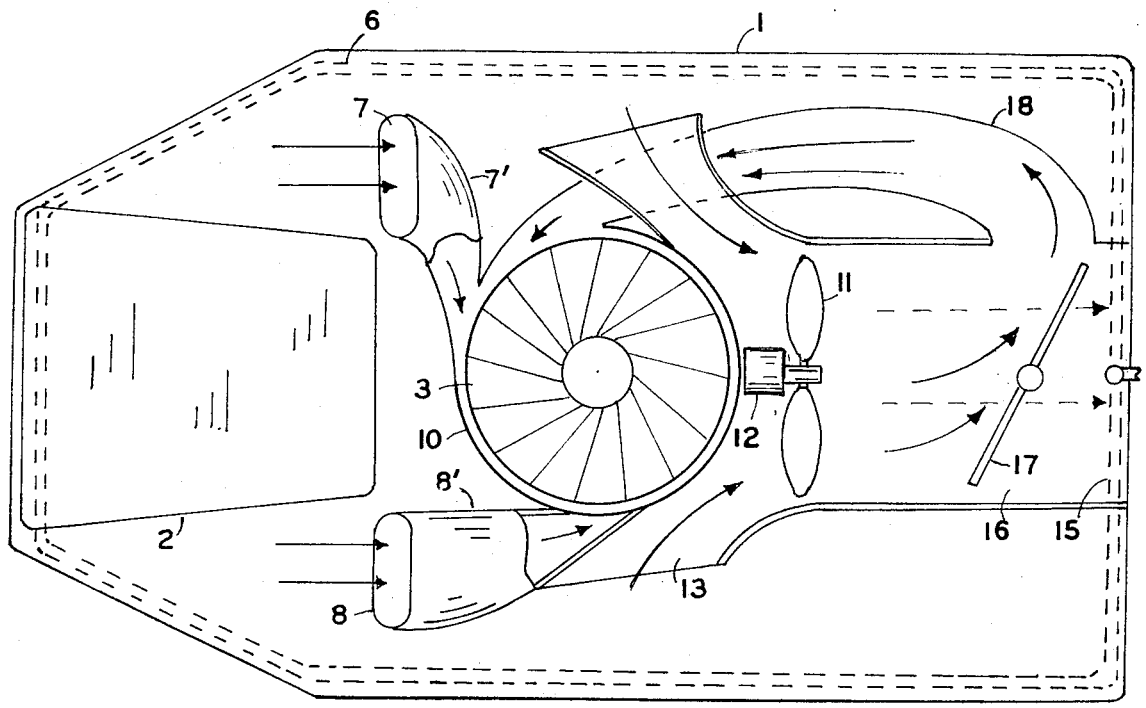
Figure 3:
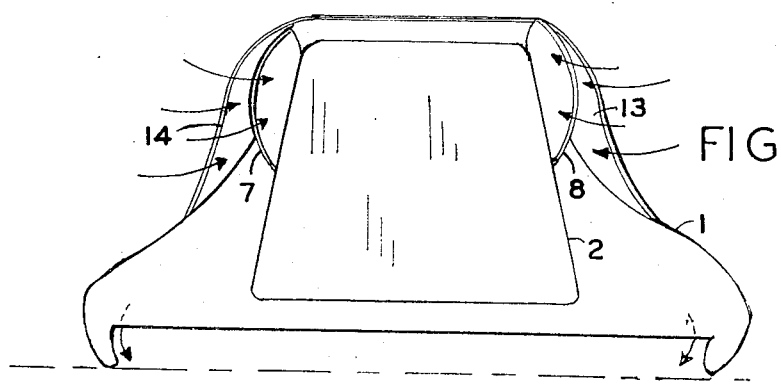
FIG. 3 is a front view of FIG. 1.
Figure 5:
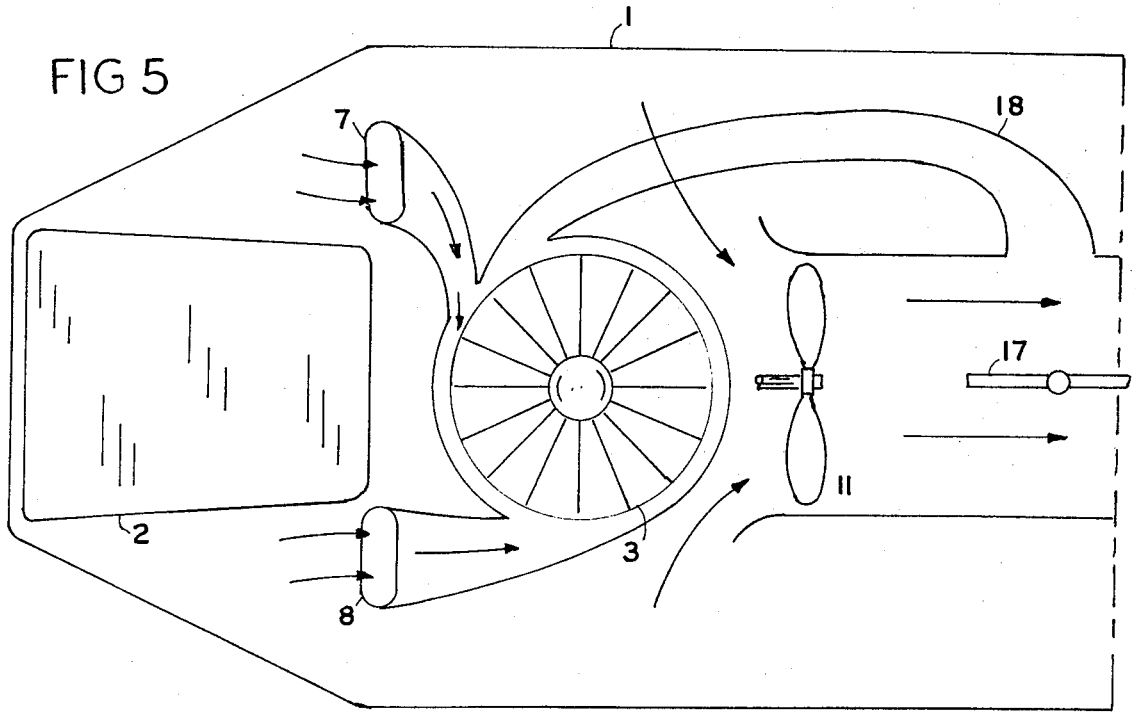

Therefore, when first starting the vehicle, the vane 17 is placed in the position shown, in FIG. 1, so that all of the air from the propeller 11 drives the fan 3 to provide the air cushion. When the craft is elevated on the air cushions, the vane 7 may then be rotated slightly to provide some air through the rear port 15 to provide a forward thrust. When the vehicle is moved forwardly, air is received through the forward intakes 7 and 8 which tends to reinforce the rotation of the fan 3, thereby providing a portion of the power required to maintain the air cushion. When the vane 17 is fully opened so that it is parallel to the axis of the craft then the craft will move directly forward. By varying the vane from the full forward position in either direction, steering may be obtained by directing the air flow to the left or right, in FIG. 5.

Figure 4:
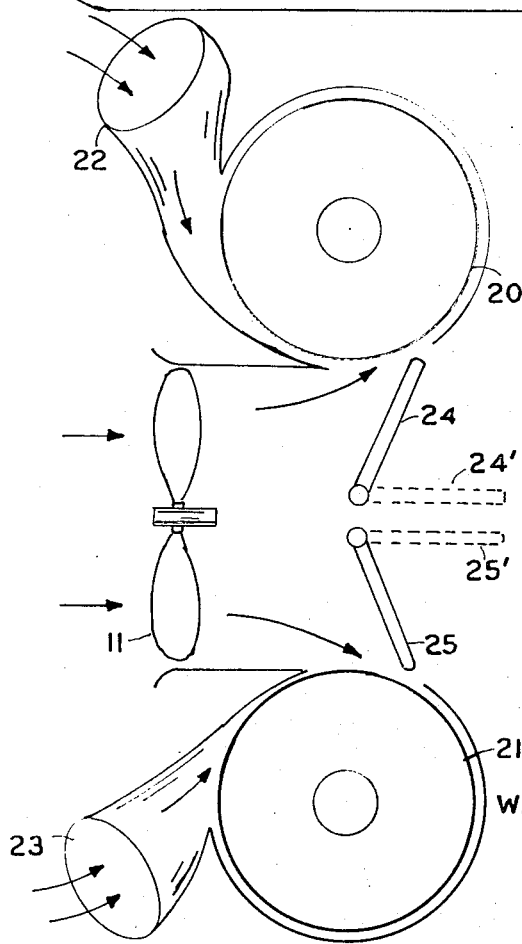
FIG. 4 is a top view of a modification of the invention.

FIG. 4 shows a modification of the invention wherein two fans 20 and 21 are used. Fan 20 is connected to the forward intake port 22, and fan 21 is connected to the forward intake port 23. Two vanes 24 and 25 are provided adjacent to the rear port. When the vanes are in the full line position, all the air is directed towards the fans. When the vanes are in the dotted lines positions 24' and 25' full forward thrust is developed. By varying one or both of the vanes steering may be obtained.

A typical vehicle for two riders would be about 14 feet long and have a 100 H.P. motor.

I claim:

1. A vehicle for travelling over a surface, said vehicle being supported upon said surface by a cushion of pressurized air comprising a body,
   means for peripherally enclosing a space beneath said body wherein a cushion of pressurized air is formed,
   first air intake means in the front of said body,
   a first port in the bottom of said body communicating with said space occupied by said air cushion,
   a first duct connecting said intake means and said first port,
   a fan freely rotatably mounted in said first duct, said fan being adapted to pump air from said intake to said first port,
   second air intake means in the sides of said body,
   a second port in the rear of said body, a second duct connecting said second air intake means to said second rear port,
   a driven propeller mounted in said second duct,
   a vane rotatably mounted in said second duct adjacent to said second rear port,
   a third duct connecting said first duct adjacent to said fan to a point in said second duct adjacent to said vane, whereby when said vane is in a first position, air is directed from said propeller to turn said fan and when said vane is in a second position a portion of the air from said propeller exits from said rear port to provide a forward thrust to said body.

2. Apparatus as in claim 1 wherein said vane is rotatably adjustable to provide steering for said vehicle.

3. Apparatus as in claim 1 wherein said first air intake means provide air power to drive said fan when said vehicle is moving forward.

* * * * *

UNITED STATES PATENT OFFICE
CERTIFICATE OF CORRECTION

Patent No. 3,718,203　　　　　　　　　Dated February 27, 1973

Inventor(s) Walter R. Lehman

It is certified that error appears in the above-identified patent and that said Letters Patent are hereby corrected as shown below:

Column 2, line 52, "propeller" should read -- propelling means --.

Signed and sealed this 3rd day of July 1973.

(SEAL)
Attest:

EDWARD M. FLETCHER, JR.　　　　　　Rene Tegtmeyer
Attesting Officer　　　　　　　　　　Acting Commissioner of Patents